(12) United States Patent
Kotha et al.

(10) Patent No.: US 11,277,525 B2
(45) Date of Patent: Mar. 15, 2022

(54) METHODS AND SYSTEMS FOR CUSTOMIZATION OF A SECURED KIOSK DEVICE

(71) Applicant: Xerox Corporation, Norwalk, CT (US)

(72) Inventors: Surya Prakash Kotha, Tamil Nadu (IN); Rajaselvam Muthuvel, Madurai (IN); Oladapo Esan, Webster, NY (US); Srinivasan Kottaiyappan, Webster, NY (US); Prince Gerald Albert, Webster, NY (US); Immaculate Sophia Albert Christie, Tamil Nadu (IN); Saravanan Krishnan, Tamil Nadu (IN); Bernard Roch Heroux, Jr., Webster, NY (US); Cynthia Moskal, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/087,843

(22) Filed: Nov. 3, 2020

(65) Prior Publication Data

US 2022/0038584 A1 Feb. 3, 2022

(30) Foreign Application Priority Data

Jul. 31, 2020 (IN) .............................. 202041032886

(51) Int. Cl.
*H04N 1/00* (2006.01)
*G06F 3/12* (2006.01)
*H04L 9/32* (2006.01)

(52) U.S. Cl.
CPC ....... *H04N 1/00167* (2013.01); *G06F 3/1208* (2013.01); *G06F 3/1222* (2013.01); *G06F 3/1238* (2013.01); *H04L 9/3213* (2013.01); *H04L 9/3247* (2013.01); *H04N 1/00143* (2013.01)

(58) Field of Classification Search
None
See application file for complete search history.

(56) References Cited

U.S. PATENT DOCUMENTS

| 6,014,137 A * | 1/2000 | Burns ................... G06Q 30/06 715/747 |
| 9,934,014 B2 * | 4/2018 | Diebolt ................ H04W 12/04 |
| 2018/0343122 A1 * | 11/2018 | Spacek .................... H04L 9/14 |

* cited by examiner

*Primary Examiner* — Thomas D Lee
(74) *Attorney, Agent, or Firm* — Fox Rothschild LLP

(57) ABSTRACT

Systems and methods for customizing a kiosk device are disclosed. The methods may include, by a processor: providing a web-interface portal that enables a user to generate a customized application package for customization of a kiosk device that provides document processing services via a print device, receiving one or more custom files to be included in the customized application package from the user via the web-interface portal, and generating the customized application package. The customized application package includes the received one or more custom files stored in a format compatible with the kiosk device. The user does not have access to the format, and the customized application package when installed on the kiosk device will cause customization of the kiosk device in accordance with the one or more custom files.

38 Claims, 5 Drawing Sheets

Android Application Package Files

301 — Drag & Drop Files Here (.apk)..
Select one or more .apk files.. [Browse..] — 308

Certificate files

302 — Drag & Drop Files Here (.cer, .p7b or .crt )...
Select one or more .cer, .p7b or .crt files... [Browse..] — 308

Home Screen Image File

303 — Drag & Drop File Here (.png or .jpg)...
Select one .png or .jpg file... [Browse..] — 308

Screen Saver Image Files

304 — Drag & Drop Files Here (.png or .jpg)...
Select one or more .png or .jpg file... [Browse..] — 308

Configuration Files

305 — Drag & Drop Files Here (.json)...
Select one or more .json files... [Browse..] — 308

Operating System File

306 — Drag & Drop File Here (.zip)...
Select one .zip file... [Browse..] — 308

FIG. 3

METHODS AND SYSTEMS FOR CUSTOMIZATION OF A SECURED KIOSK DEVICE

RELATED APPLICATIONS AND CLAIM OF PRIORITY

This patent document claims priority under 35 U.S.C. § 119(1) to Indian Patent Application Number 202041032886, filed Jul. 31, 2020.

BACKGROUND

With the ubiquity of portable electronic devices such as personal digital assistants, cellular telephones, and laptops, as well as increasing dependency on e-mail and other aspects of the internet, situations often arise in which a person will need to print or scan documents, photos, or the like. While public places may offer Internet access, these typically do not offer printing and other services that users may need. Kiosks may be configured to provide self-service public access to services such as printing and scanning in public areas.

Kiosks typically reside in large networks, in which many kiosks are managed by a single entity or by multiple entities acting in concert (e.g., a manufacturing entity). For ease of management and consistency of operation of the kiosks in a network, the entity managing the network typically installs a common set of applications among all (or some subset) of the kiosks in the network. Each of these applications includes one or more "executable" files containing computer-executable code that defines the workflow of the application as it drives operation of the kiosk. Executable files are well-known in the computer industry and are not described in any detail here. To install applications on the kiosks in the network, the manufacturing entity must deliver the executable files that make up the applications to the kiosks, typically by sending the executable files over the network. Once the applications are installed to the kiosks, the kiosks can run the applications by invoking the corresponding executable files. Any changes must be done by the manufacturing entity itself, and need to be properly signed and encrypted in order to prevent any security breaches.

However, such application workflows offered by a manufacturing entity are not tailored to a specific business (e.g., a service provider). Moreover, a business is usually provided an application presentment that has no customization in both implementing the business's aesthetic online appearance or branding as well as executing custom business logic scripts to conform to the business's customary business practices. The business is typically prevented from changing and/or or customizing the workflow of an application that has been installed by the manufacturing entity by use of specific executable file formats and encryption protocols.

This document describes a system that may address at least some of the issues described above.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In certain scenarios, a system may a processor and a computer-readable storage medium comprising one or more programming instructions that, when executed, will cause the processor to execute methods for generating a customized application package. The methods include providing a web-interface portal that enables a user to generate a customized application package for customization of a kiosk device. The kiosk device is configured to provide document processing services via a print device. The methods also include receiving one or more custom files to be included in the customized application package from the user via the web-interface portal, and generating the customized application package comprising the received one or more custom files stored in a format compatible with the kiosk device. The methods ensure that the user does not have access to the format, and the customized application package when installed on the kiosk device will cause customization of the kiosk device in accordance with the one or more custom files. Optionally, the web-interface portal may be provided via a client device in communication with the processor.

Generating the customized application package may include bundling the received one or more custom files in the format compatible with the kiosk device to generate a package, and encrypting the generated package. Optionally, encrypting the generated package may include asymmetrical encryption using a public key associated with the kiosk device or the user, while a private key is stored at the kiosk device. Additionally and/or alternatively, encrypting the generated package may include using a randomly generated key. The method may also include encrypting the secret key, and storing the encrypted secret key in a footer of the customized application package.

The methods may also, optionally, include generating a digital signature associated with an entity allowed to customize the kiosk device using a cryptographic key, encrypting the cryptographic key, and storing the encrypted cryptographic key in a footer of the customized application package.

The methods may also include performing testing on the one or more custom files to verify absence of security issues before generating the customized application package.

In certain embodiments, generating the customized application package may include including information in a declarative file format in the customized application package. The information may include one or more instructions for performing at least one of the following: installation of the customized application package on the kiosk device, installation of the one or more custom files on the kiosk device, and/or decryption of the customized application package.

The methods may also include either creating a downloadable file including the customized application package for download to a secondary storage device and/or transmitting the customized application package to a remote server in communication with the kiosk device. Optionally, the methods may include receiving a request for the customized application package from the kiosk device, and causing the remote server to transmit the customized application package to the kiosk device.

The one or more custom files may include at least one of the following: an application file comprising custom workflow information for executing one or more applications on the kiosk device, an image file for a home screen display on the kiosk device, a security file comprising information relating to one or more digital certificates to be used by the kiosk device, a configuration file, or an operating systems file.

In some other scenarios, a print system is disclosed, the print system including a kiosk device in communication with a print device. The kiosk device may include a processor and a computer-readable storage medium comprising one or more programming instructions that, when executed, will cause the processor to perform the methods of this disclosure. The methods may include receiving a customized application package, retrieving an encrypted cryptographic key stored in a footer of the customized application package, decrypting the encrypted cryptographic key, using the cryptographic key to verify that a digital signature included in the customized application package is associated with an entity allowed to configure the kiosk device, and installing the customized application package for customization of the kiosk device upon verification. The customized application package may include one or more custom files in a format compatible with the kiosk device.

The methods may also include decrypting the customized application package using a private key previously stored at the kiosk device (where the received customized application package is encrypted using a corresponding public key). Additionally and/or alternatively, the methods may include retrieving an encrypted secret key stored in a footer of the customized application package, decrypting the encrypted secret key using a private key previously stored at the kiosk device, and using the decrypted secret key to decrypt the customized application package.

The customized application packaged may be received from a temporary storage device coupled to the kiosk device and/or from a remote server in response to transmission of a request for an update to the remote server.

The methods may also include customizing the kiosk device in accordance with the one or more custom files upon installation of the customized application package. Optionally, the kiosk device may execute a print workflow in accordance with a custom print application included in the customized application package for printing a document at the print device.

BRIEF DESCRIPTION OF THE DRAWINGS

FIG. 3 illustrates an example user interface of a portal for generation of the customized application package.

DETAILED DESCRIPTION

The following terms shall have, for purposes of this application, the respective meanings set forth below:

A "computing device" or "client device" refers to a device that includes a processor and tangible, computer-readable memory. The memory may contain programming instructions that, when executed by the processor, cause the electronic device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

A "document" refers to a digital representation of a document such as a word processor file, a PDF file, or a bitmap file (e.g. TIFF, JPG, PNG files etc.) that is stored in a computer readable memory or a storage medium. A document file may be an electronic representation of a physical document that contains one or multiple pages. A document may also refer to the set of instructions or metadata that cause the document to be processed.

A "document processing service" refers to a service that can modify or otherwise process a document, for example, by performing print-related services, document repository services, scanning services, document management services, image processing services and/or the like.

A "kiosk" system refers to a physical structure that includes a display device and a computing device that includes and/or is in communication with at least one print device, such that the kiosk provides a self-service station for providing public access to document processing facilities (e.g., printing, scanning, etc.). Optionally, a print device may be configured to function as a kiosk for providing public access to document processing services. It will be understood that a kiosk device in accordance with the disclosure could also be provided as a computing device or some other self-service system.

The term "print device" refers to a machine having hardware capable of reading a digital document file and using the information from the file and associated print instructions to print of a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device.

The term "workflow" refers to a sequence of connected steps and may provide a depiction for a sequence of operations, which may be declared as the task(s) of a kiosk device when executing a document processing function.

Figure 1:
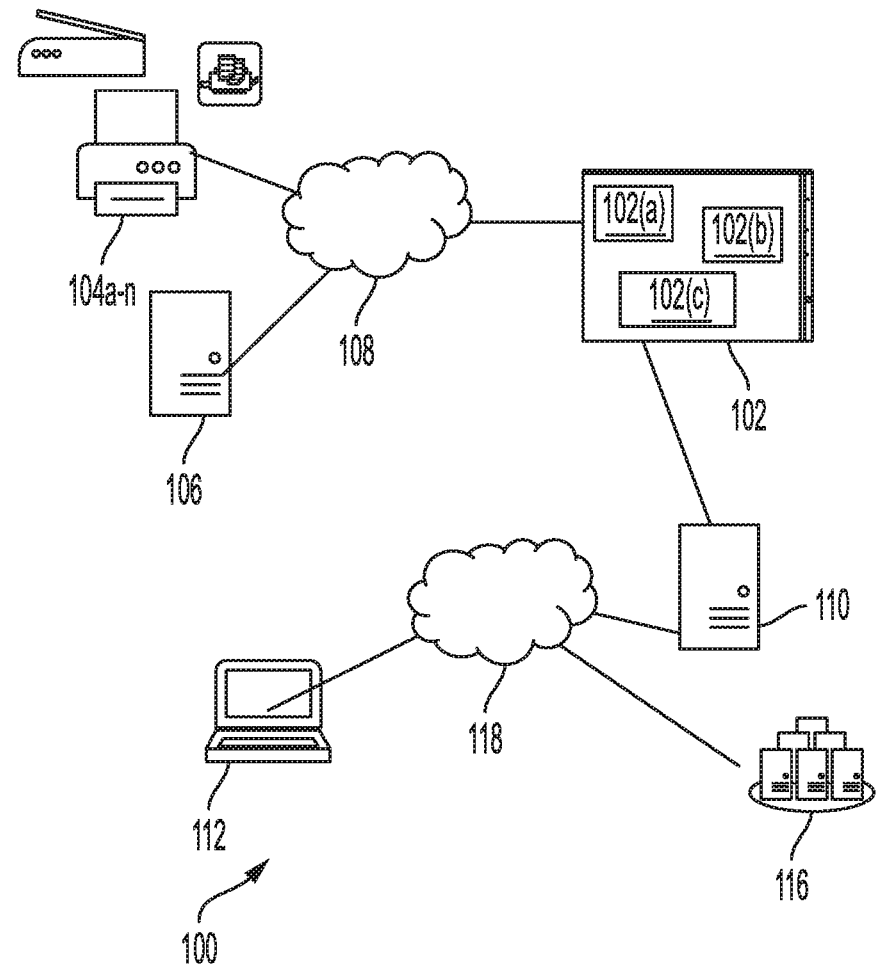
FIG. 1 illustrates an example system for customization of a secured kiosk device according to an embodiment.

FIG. 1 illustrates an example system for customization of a secured kiosk device according to an embodiment. As shown in FIG. 1, the system 100 includes a kiosk device 102 in communication with one or more print devices 104*a*-N such as printers, scanners, multifunction devices (MFDs), copiers, or the like via a communication network 108. In certain embodiments, a print device may be a part of the kiosk device 102.

The kiosk device 102 may be a self-service station for providing public access to document processing facilities or services (e.g., printing, scanning, etc.) via one or more print devices 104*a*-N. The kiosk device 102 may provide paid document processing services to users. Users may interact with kiosk device 102 to provision the document processing services for a variety of purposes, such as to print, scan, copy, FAX, and/or other suitable purpose. The kiosk device 102 may include, without limitation a display device 102(a), a computing device 102(b), and an interface 102(c). In some embodiments, the display device 102(a) may be configured to display user interface (UI) elements to interact with users, as well as data requested for display by users. The interface 102(c) may be associated with input devices such as, without limitation, keyboard and pointing devices, a microphone, speakers, credit card reader, check reader, user device interface (e.g., a wireless or wired connection where the user connects his or her mobile phone or other user device to kiosk device 102), and/or can be a touch sensitive display that is also a graphical user interface (GUI) input device. The interface 102(c) may receive input, send output, process the input and/or output and/or performs other suitable operations.

The kiosk device 102 includes security firewalls and/or other restrictions that only allow certain entities (e.g., a manufacturer) to install new applications, update existing applications, and/or customize workflows, look and feel, etc. associated with the kiosk device or applications of the kiosk device. In other words, the kiosk device is secured and only allows certain types and/or formats of executable file installations (those associated with the entities allowed to make changes to the kiosk device) and/or only upon successful verification using various security checks (e.g., using security certifications associated with such entities). The current disclosure describes systems and methods for allowing authorized users (e.g., a kiosk device owner) to customize the kiosk device without getting access to proprietary file formats, encryption keys, security certificates etc. of the entities (e.g., manufacturer) allowed to perform such customizations.

The kiosk device 102 may also be in communication with one or more remote services 106 via a communication network 108. A communication network 108 may be a local area network (LAN), a wide area network (WAN), a mobile or cellular communication network, an extranet, an intranet, the Internet and/or the like. The print devices 104a-N may receive instructions from the kiosk device 102 and perform various functions. The remote services 106 may include, without limitation, document management services, cloud storage systems or servers, or the like (e.g., XEROX Docushare® GoogleDrive®, Dropbox®, MICROSOFT OneDrive®, etc.) for storing and/or managing user documents. The document management services may provide cloud storage by accepting one or more standard web-based communication protocols for storing and retrieving files. For example, the File Transfer Protocol ("FTP") may be used to upload a file to a cloud storage server, and the Hypertext Transfer Protocol ("HTTP") may be used to download a file from a cloud storage server. Users may also access documents directly at the kiosks, such as by using a USB flash drive.

The system may also include a remote server 110 in communication with the kiosk device 102 (e.g., via the communication network 108). The remote server 110 is also in communication with a client device 112 via a second communications network 118. A communication network 118 may be a local area network (LAN), a wide area network (WAN), a mobile or cellular communication network, an extranet, an intranet, the Internet and/or the like. A user of client device 112 may access the remote server 110 in order to generate a kiosk application package based on information received from an authorized user, the customized application package being an executable file installable on a kiosk device for customizing the kiosk device. The remote server 110 may be managed by entities authorized to customize the kiosk device. The same authorized entities may deploy a web interface for sutomizing the kiosk device via a client device. The client device 112 may be any computing device and may operate in the capacity of a server or a client machine in a client-server network environment, or as a peer machine in a peer-to-peer (or distributed) network environment.

The remote server 110 is capable of deploying a web-interface to generate the customized application package as described in this disclosure. The remote server 110 may provide a web-interface to a user via a client device 112 so that the user may create a customized application package for customization of a kiosk device. The customized application package may be a set of computer executable instructions that may configure a kiosk to perform one or more functions, and create workflows, user interfaces, etc. associated with each of the one or more functions. The customized application package may include, without limitation, an application file, an operating system file, a screen saver file, a home screen file, a configuration file, a security file, and the like. Each of these components of the customized application package may be customized by a user who is not associated with the entity allowed to customize a kiosk device. For example customized application package may include a custom application for execution on the computing device 102(b) of the kiosk device 102, and may customize the workflows and/or UIs associated with the application execution by associating the custom application with any desired look and feel, features, menu items, or controls via the web-based interface at the client device 112. The remote server 110 may package the custom application in a format that is compatible with the computing device 102(b), encrypt using suitable encryption protocols, and otherwise perform functions for installation on the kiosk device 102 (as discussed below) to create the customized application package.

The customized application package may be stored at the remote server 110 and/or downloaded to a temporary storage such as a USB for installation at the kiosk device 102.

The remote server 110 may be communicably coupled with one or more data stores 116 that store the information related to customization data for applications, security certificates, encryption keys, templates, user authentication, or the like.

Figure 2:
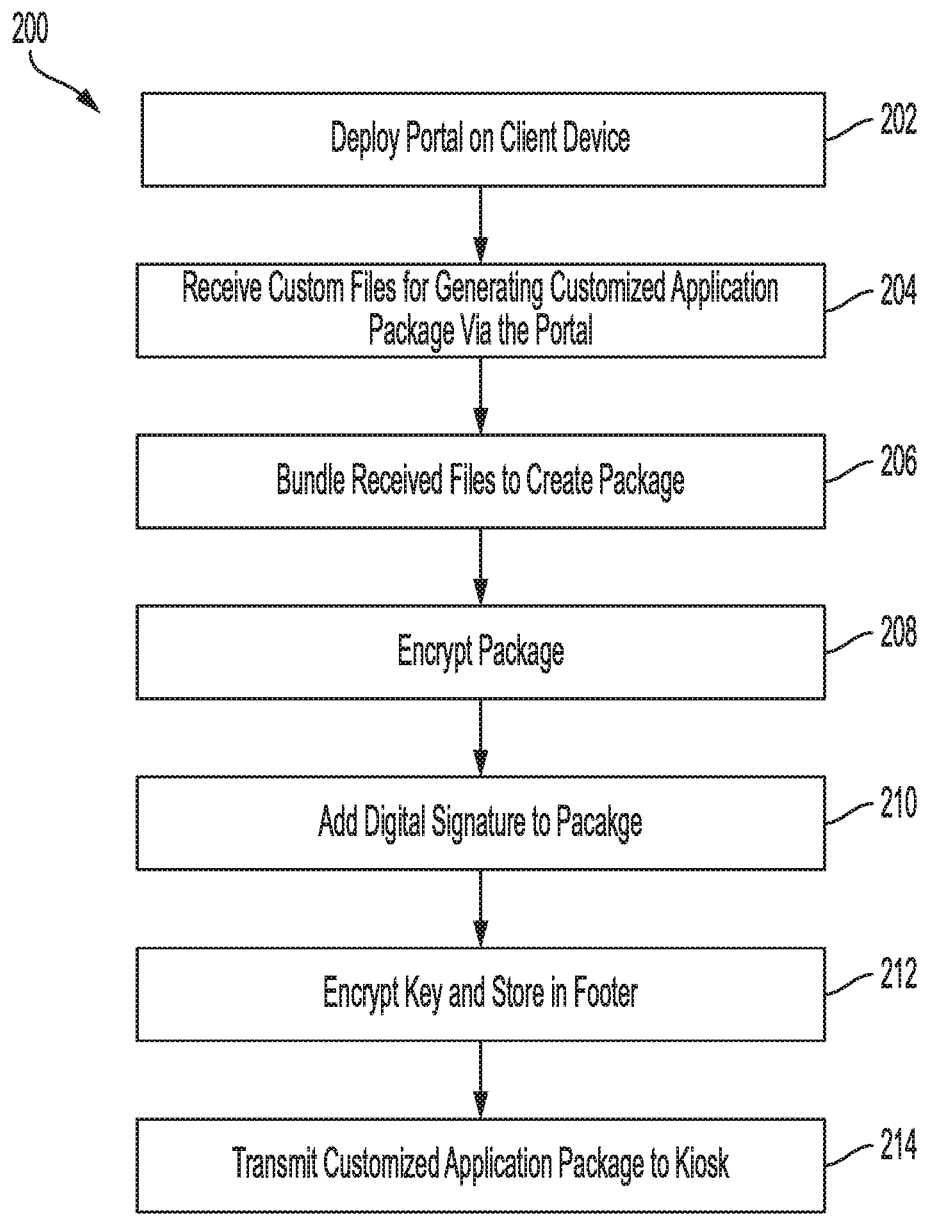
FIG. 2 is a flowchart illustrating an example method for generating a customized application package for customization of a kiosk device according to an embodiment.

In FIG. 2, methods for accomplishing various tasks for generating a customized application package for customization of a secured kiosk device in the systems disclosed in FIG. 1. While the method 200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 2, but the process may be integrated and/or one or more steps may be performed together, or the steps may be performed in the order disclosed or in an alternate order.

At 202, the system may deploy a portal (e.g., a web-interface) to generate a customized application package for a kiosk device. The web-interface may be deployed, for example, at a website executing in a browser of a client device. The web-interface may allow a properly authenticated and authorized user to perform various functions for generation of a customized application package. It should be noted that each user may be associated with one or more kiosk devices (e.g., a user who is a print shop owner/ employee may be associated with kiosk devices in the print shop). The customized application package is installable for execution on a kiosk device in order to for example, install a new application on the kiosk device, update an existing application, modify/customize the UI platform of the kiosk device, customize the kiosk device display with any desired look and feel, features, menu items, or controls, or the like.

At 204, the system may receive, via the web-interface, one or more executable files and/or other information for generating the customized application package. Examples of such executable files may include, without limitation, an application file, an operating system file, a screen saver file, a home screen file, a configuration file, a security file (e.g., digital certificate files), and the like. Examples of other information may include, without limitation, kiosk identification associated with one or more kiosks that will be customized using the generated customized application package, user identification/authentication information, image resolution information, print device information associated with a kiosk, or the like. As discussed above, a user is associated with a kiosk device and the system may identify the kiosk device for which the customized application package will be generated based on user identification information received from the user.

FIG. 3 illustrates an example web-interface that may be generated by the system for receiving one or more custom executable files and/or other information for creating the customized application package. As shown in FIG. 3, a user may drag and drop files into the appropriate locations (e.g., application files in box 301, an operating system file in box 306, a screen saver file in box 305, a home screen file in box 304, a configuration file in box 303, and a security file (e.g., certificate files) in box 302). Optionally, a user may use a browse link, upload link, or the like (308), for uploading various files on the portal, information for managing various applications, removing previously installed applications, or the like.

In certain embodiments, an application file may be a custom application file that is installable for execution on a kiosk device and that defines one or more workflows associated with one or more applications of a kiosk device. For example, the application file may be an executable print function application file that when installed on a kiosk device defines a custom workflow for printing at a print device via the kiosk device. Such workflow may include a sequence of steps to be performed by a kiosk device for performing a printing operation such as, without limitation, output a home screen (e.g., including a current promotional offer and a user interface that can be used by a user to submit a print job), receive an identification of a print document, receive and verify payment, perform document pre-processing, create a print job, identify a print device, send print job to the print device, output a confirmation, or the like. The workflow may also include generating various user interfaces associated with each step (e.g., images, icons, instructions, etc. for a user). The workflow may be customized in the sequence and/or listing of steps, associated user interfaces, methods for processing payment, methods for verifying user identity, allowed print device capabilities, etc.

Examples of custom application files include an APK file in the case of ANDROID® OS variants, an IPA file in the case of IOS® OS variants, or an XAP file in the case of WINDOWS® OS variants; however, implementations herein are not limited to these examples.

Certificate files may include, without limitation, digital certificates that the kiosk device may use for establishing secure connections with, for example, the remote server, a payment server, or other devices during the execution of an application (or otherwise). Such digital certificates may be issued by the corresponding server, and stored at the client device executing the web-interface for inclusion in a customized application package.

As will be understood to those of skill in the art, certificate pinning is used to ensure that applications (of the kiosk device) only communicate with trusted servers. A kiosk device operating an application may check an associated server's digital certificate against a certificate received in the customized application package. Public key infrastructure (PKI), SSL certificates, and other now or hereafter known certificates are within the scope of this disclosure.

Various image files may also be included in the customized application package to be displayed on a display associated with the kiosk device such as, without limitation, a screen saver screen, a home screen, an application execution screen, a menu screen, and a keypad screen. A custom application file may be used to determine the content and layout of the display at any given time using the various image files. The home screen refers to a screen where image and icons for executing applications are arranged and displayed, for example, when an application is not executing on the kiosk device. When one of the icons of executing applications displayed on the home screen is selected by the user, the kiosk device may execute the selected application and may display the executed screen. Home screen image files may include images (or videos) that will be displayed on the display of a kiosk device as a home screen between various kiosk operations (e.g., current or future promotional offers, icon images for accessing various kiosk functionalities, or other layouts). For instance, several wallpaper files can be installed onto the kiosk device via the customized application package, and an application can enable display of a particular wallpaper under various determinable conditions (e.g., time of day, location, kiosk device locale such as office, home, restaurant, shopping complex, etc., weather, local news, or the like) Similar to the home screen image files, screen saver image files may include images (or videos) that will be displayed on the display of a kiosk device as a screen saver under various determinable conditions (e.g., when the kiosk device has been idle for a threshold time, kiosk device is restarting, kiosk device is not functional, or the like).

The configuration files may include various configuration information for the kiosk device to execute applications, and/or information for dynamically configuring one or more applications. For example, the configuration files may include information about print device capabilities, network address and communication protocols for connecting to print devices (and/or a path to a directory where such information may be accessed), paths to various storage locations (for example, for accessing various image files), rules for enabling and disabling various applications on a kiosk device (e.g., print applications may only be available at certain times and the configuration files may be used by the kiosk device to enable/disable a print application accordingly), or the like.

Operating system files may include files for performing updates (e.g., firmware updates) and/or configuring the operating system of the computing device included in a kiosk device.

At 206, the system may bundle the received files and information to create a package in a defined structure or format that allows for installation and execution of files included in the package on a kiosk device. Examples of such structure/formats may include, without limitation XSP, ZIP, TAR, RAR, or the like. It should be noted that the structure/format may be specific to a kiosk device (identified based on the user identification information, kiosk identification, etc.). Optionally, the system may perform various testing and verification operations for identifying any issues (e.g., security issues) associated with the received files before bundling the files. For example, the system may run tests like WEBINSPECT for identifying vulnerabilities in application files, memory leak detections, virus scans for image files, etc.

The system may also create custom declarative files (e.g., XML files) including information relating to installation of the package on a kiosk device. For example, the information may include instructions for installation of the package using a USB storage device (e.g., download on USB storage, plug in to the kiosk device, directory address of stored package on the USB device, etc.) and/or via download from a server where the package will be stored (e.g., network address of the server). Additional levels of customization may be provided, if required by the kiosk device (e.g., when a restart is required before/after installation).

At 208, the system may encrypt the generated package using any now or hereafter known encryption methods to generate an encrypted package. For example, each authorized user of a kiosk device may be assigned a public-private key pair (e.g., RSA encryption, asymmetric encryption, etc.), and the system may use the public key (e.g., received from the kiosk device) to encrypt the generated package while the private key is stored at the kiosk device. As such, the package can only be decrypted and installed on a kiosk device that has the private key for decryption. In other embodiments, an AES secret key can be randomly generated and formatted to base64, which may then be used to encrypt the generated package using the aes-128-cbc standard. Optionally, the secret key may also be encrypted (e.g., using a 4096 key length RSA public key) and appended to the footer of the package in step 212 (discussed below).

At 210, the system may also add a signature associated with an entity that is allowed to configure the kiosk device (e.g., a manufacturer entity) to the encrypted package, and which may be used by the kiosk device to verify the authenticity of the package. Signing may be in the form of digital signature, encryption, or one-way hash. Such signatures must be verifiable, if a dispute arises as to whether a party signed a file. A digital signature of a message is a sequence of bytes dependent on some secret known only to the signer, and, additionally, on the content of the file being signed. For example, signing may refer to the process of computing a checksum and attaching the computed checksum to the encrypted package as a signature. Optionally, a digital signature may be generated using public key cryptography that includes a cryptographic primitive that provides a means for a user or an entity to bind its identity to a piece of information. If public key cryptography is used for signing, the signing authority signs records in signing entity with his/her private key, and the public key is available at the kiosk device. The process of signing entails transforming the message and a key unique to a particular entity into a tag called a digital signature. A digital signature, in the current disclosure, may be used to prove that an entity is allowed to configure the kiosk device generated the customized application package as well as the integrity of the package itself. To verify the digital signature, a recipient of a digitally signed package (i.e., a kiosk device) can use a verification rule associated with the digital signature scheme. Any attempt to modify the contents of the package or forge a signature will be detected when the signature is verified. Other encryption and digital signature schemes are all well within the scope of the invention.

The cryptographic key and/or the checksum used for adding the signature may be encrypted (using a public key of a private/public key pair) and stored in a custom footer of the encrypted package to generate the customized application package (212). Optionally, if a secret key is used for encrypting the package, the secret key may also be encrypted using the same public key and the encrypted secret key may also be stored in the custom footer. The corresponding private key can be stored at the kiosk device for decrypting the checksum (or cryptographic key) and/or the secret key.

At 214, the generated customized application package may be transmitted for installation on a kiosk device. For example, the customized application package may be stored in a remote server in association with a kiosk device identifier, and that may transmit the customized application package to the kiosk device upon receipt of a request (e.g., a request for an update). It should be noted that the request for an update is always initiated by the kiosk device, and not the remote server due to network security constraints configured by a manufacturer of the kiosk device. Optionally, a user may download the customized application package onto a temporary storage device (e.g., USB device), and transmit the customized application package to the kiosk device for installation by coupling the temporary storage device to the kiosk device (e.g., a USB port).

Figure 4:
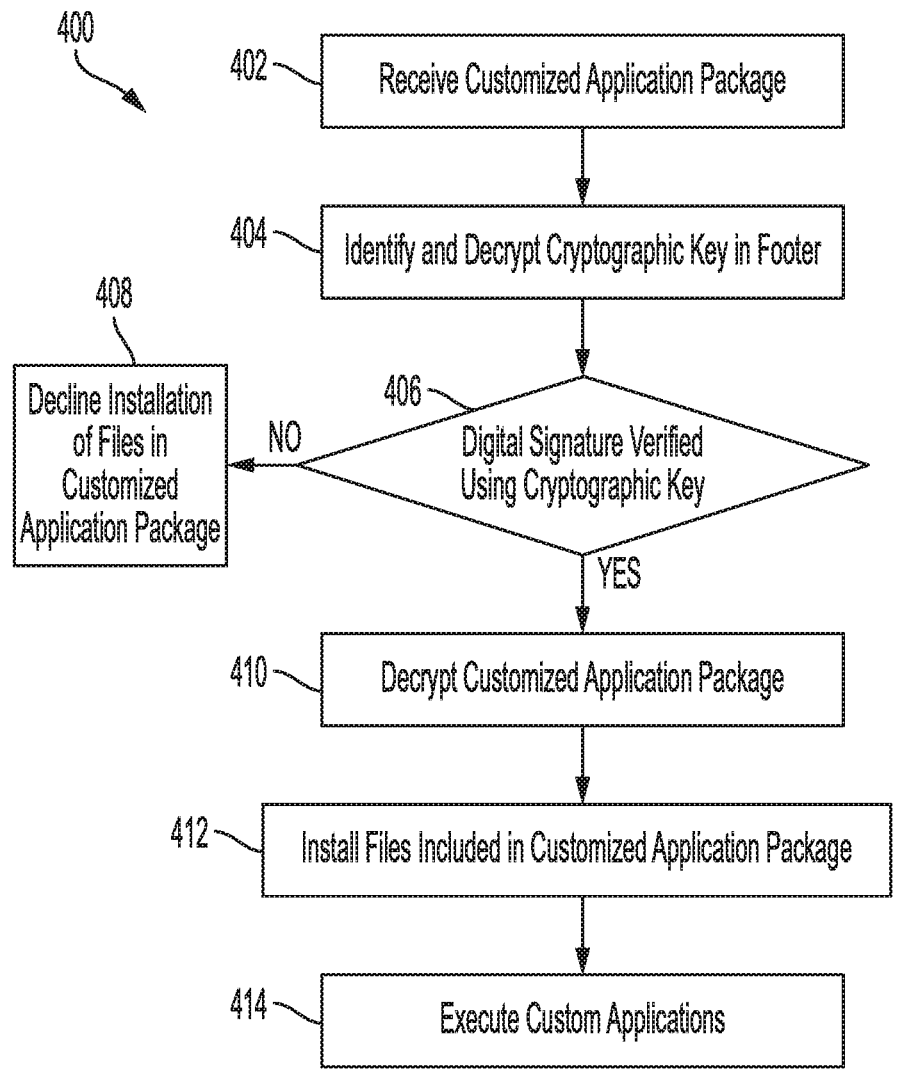
FIG. 4 is a flowchart illustrating an example method for customization of a secured kiosk device according to an embodiment.

In FIG. 4, methods for accomplishing various tasks for installation of a customized application package on a secured kiosk device in the systems disclosed in FIG. 1. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 2, but the process may be integrated and/or one or more steps may be performed together, or the steps may be performed in the order disclosed or in an alternate order.

At 402, a kiosk device may receive a customized application package. For example, as discussed above, the customized application package may be received from a temporary storage device coupled to the kiosk device and/or from a remote server in response to a request for an update.

At 404, the kiosk device may identify and decrypt an encrypted checksum (or encrypted cryptographic key) stored in a footer of the received customized application package. The kiosk device may use a previously stored private key of a public/private key pair to perform the decryption (where the encryption was performed using the public key). Optionally, the kiosk device may also extract an encrypted secret key from the footer, and use the private key to decrypt the secret key (as discussed above, the secret key can be used to encrypt the package).

At 406, the kiosk device may use the decrypted checksum or cryptographic key to verify whether the digital signature included in the customized application package is associated with an entity that is allowed to configure the kiosk device (e.g., a manufacturer entity). For example, the kiosk device may compare the digital signature to previously stored digital signatures corresponding to entity(ies) allowed to configure the kiosk device to determine whether a match exists. Optionally, the kiosk device may generate a checksum and determine whether it matches the decrypted checksum from the footer. If the checksums match, the digital signature is verified. If the digital signature (i.e., when checksums do not match) included in the customized application package is not associated with an entity that is allowed to configure the kiosk device (406: NO), the kiosk device may decline installation of files included in the customized application package and/or provide an output indicating that files cannot be installed (408).

If the digital signature included in the customized application package is associated with an entity (i.e., checksums match) that is allowed to configure the kiosk device (406: YES), the kiosk device may decrypt the customized application package to retrieve the bundled applications and the installation information (410). For example, the kiosk device may use for example, the decrypted secret key to perform the decryption. Optionally, the kiosk device may use its private key for decrypting the customized application package. Furthermore, as discussed above, the decrypted package includes bundled applications and information in a format or structure that is recognizable by the kiosk device.

At 412, the kiosk device may install the files included in the decrypted package in accordance with the instructions for customization of the kiosk device. In this manner, a user may be allowed to customize the kiosk device without requiring sharing of proprietary information (e.g., file formats and structures) of entities such as manufacturers with said user, and without compromising the security and integrity of the kiosk device (since the package is encrypted and also includes a digital signature for verification of the package generation entity).

At 414, the kiosk device may execute one or more custom applications in accordance with the workflows included in the corresponding application files (and using configuration files, image files, etc.) to provide a customized experience to a kiosk device user. For example, the kiosk device may execute a print application to print or otherwise process a document by performing one or more workflow steps, while dynamically displaying appropriate images (e.g., promotional offers) to a user.

Figure 5:
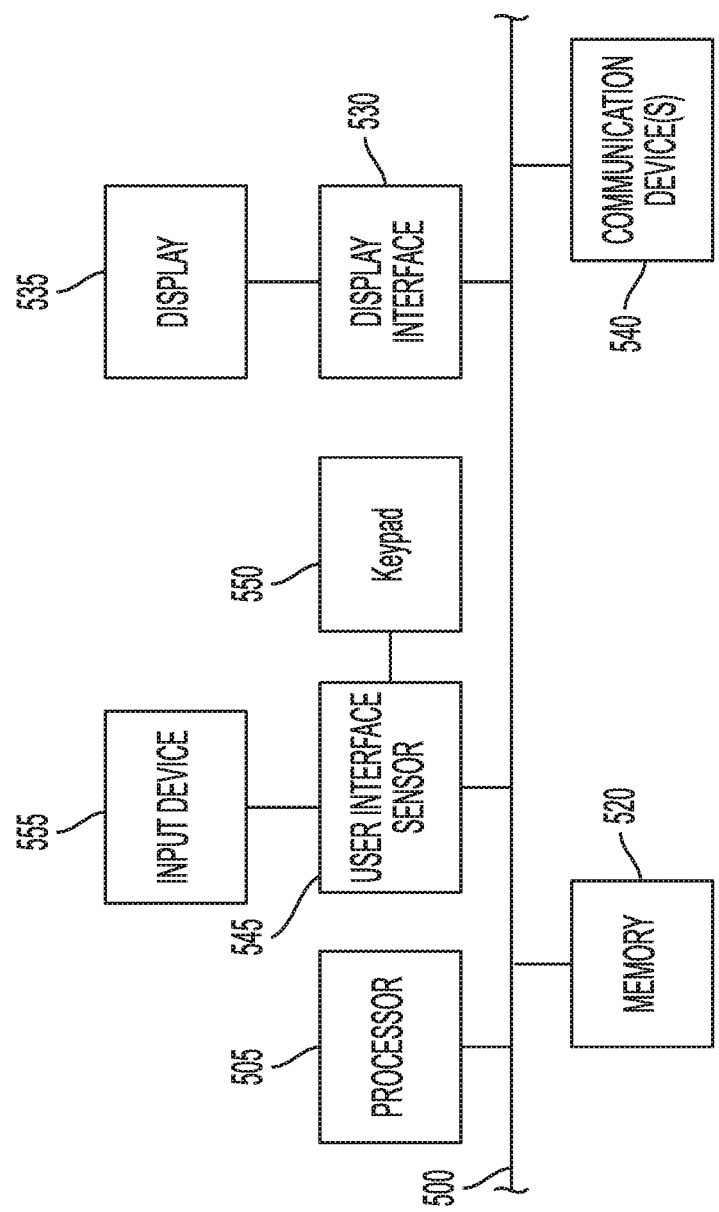
FIG. 5 illustrates a block diagram of example hardware that may be used to contain or implement program instructions according to an embodiment.

FIG. 5 depicts an example of internal hardware that may be included in any of the electronic components of the system, such as the kiosk device, the print device, or the remote services and/or hardware that may be used to contain or implement program instructions. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an example of a processor as such term is used within this disclosure. Read only memory (ROM) and random access memory (RAM) constitute examples of non-transitory computer-readable storage media 520, memory devices or data stores as such terms are used within this disclosure.

Program instructions, software or interactive modules for providing the interface and performing any querying or analysis associated with one or more data sets may be stored in the memory device 520. Optionally, the program instructions may be stored on a tangible, non-transitory computer-readable medium such as a compact disk, a digital disk, flash memory, a memory card, a USB drive, an optical disc storage medium and/or other recording medium.

An optional display interface 530 may permit information from the bus 500 to be displayed on the display 535 in audio, visual, graphic or alphanumeric format. Communication with external devices may occur using various communication ports 540. A communication port 540 may be attached to a communications network, such as the Internet or an intranet.

The hardware may also include an interface 545 which allows for receipt of data from input devices such as a keypad 550 or other input device 555 such as a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A system comprising:
a processor; and
a computer-readable storage medium comprising one or more programming instructions that, when executed, will cause the processor to:
provide a web-interface portal that enables a user to generate a customized application package for customization of a kiosk device that provides document processing services via a print device;
receive, from the user via the web-interface portal, one or more custom files to be included in the customized application package; and
generate the customized application package comprising the received one or more custom files stored in a format compatible with the kiosk device, wherein:
the user does not have access to the format, and
the customized application package when installed on the kiosk device will cause customization of the kiosk device in accordance with the one or more custom files.

2. The system of claim 1, wherein the programming instructions that, when executed, will cause the processor to generate the customized application package further comprise instructions to:
bundle the received one or more custom files in the format compatible with the kiosk device to generate a package; and
encrypt the generated package.

3. The system of claim 2, wherein encrypting the generated package comprises asymmetrical encryption using a public key associated with the kiosk device or the user, while a private key is stored at the kiosk device.

4. The system of claim 2, wherein encrypting the generated package comprises using a randomly generated secret key.

5. The system of claim 4, further comprising one or more programming instructions that, when executed, will cause the processor to:
encrypt the secret key; and
store the encrypted secret key in a footer of the customized application package.

6. The system of claim 2, further comprising one or more programming instructions that, when executed, will cause the processor to:
generate, using a cryptographic key, a digital signature associated with an entity allowed to customize the kiosk device;
encrypt the cryptographic key; and store the encrypted cryptographic key in a footer of the customized application package.

7. The system of claim 1, further comprising one or more programming instructions that, when executed, will cause the processor to, before generating the customized application package, perform testing on the one or more custom files to verify absence of security issues.

8. The system of claim 1, wherein the programming instructions that, when executed, will cause the processor to generate the customized application package further comprise instructions to include information, in a declarative file format, the information comprising one or more instructions for performing at least one of the following: installation of the customized application package on the kiosk device; installation of the one or more custom files on the kiosk device; or decryption of the customized application package.

9. The system of claim 1, further comprising one or more programming instructions that, when executed, will cause the processor to perform at least one of the following:
create a downloadable file including the customized application package for download to a secondary storage device; or
transmit the customized application package to a remote server in communication with the kiosk device.

10. The method of claim 9, further comprising one or more programming instructions that, when executed, will cause the processor to:
receive, from the kiosk device, a request for the customized application package; and
cause the remote server to transmit the customized application package to the kiosk device.

11. The system of claim 1, wherein the one or more custom files comprise at least one of the following:
an application file comprising custom workflow information for executing one or more applications on the kiosk device;
an image file for a home screen display on the kiosk device;
a security file comprising information relating to one or more digital certificates to be used by the kiosk device;
a configuration file; or
an operating systems file.

12. The system of claim 1, wherein the web interface portal is provided via a client device in communication with the processor.

13. A print system comprising:
a kiosk device in communication with a print device, the kiosk device comprising:
a processor; and
a computer-readable storage medium comprising one or more programming instructions that, when executed, will cause the processor to:
receive a customized application package, the customized application package comprising one or more custom files in a format compatible with the kiosk device,
retrieve an encrypted signature key stored in a footer of the customized application package,
decrypt the encrypted signature key,
use the signature key to verify that a digital signature included in the customized application package is associated with an entity allowed to configure the kiosk device, and
upon verification, install the customized application package for customization of the kiosk device.

14. The print system of claim 13, wherein the kiosk device further comprises one or more programming instructions that, when executed, will cause the processor to decrypt the customized application package using a private key previously stored at the kiosk device.

15. The print system of claim 13, wherein the kiosk device further comprises one or more programming instructions that, when executed, will cause the processor to:
retrieve an encrypted secret key stored in a footer of the customized application package;
decrypt the encrypted secret key using a private key previously stored at the kiosk device; and
use the decrypted secret key to decrypt the customized application package.

16. The print system of claim 13, wherein the programming instructions that cause the processor to receive the customized application package comprise programming instructions that cause the processor to receive the customized application package from a temporary storage device coupled to the kiosk device.

17. The print system of claim 13, wherein the programming instructions that cause the processor to receive the customized application package comprise programming instructions that cause the processor to:
transmit a request for an update to a remote server; and
receive the customized application package from the remote server.

18. The print system of claim 13, wherein the kiosk device further comprises one or more programming instructions that, when executed, will cause the processor to customize the kiosk device in accordance with the one or more custom files upon installation of the customized application package.

19. The print system of claim 18, further comprising programming instructions that when executed will cause the processor to execute a print workflow in accordance with a custom print application included in the customized application package for printing a document at the print device.

20. A method for customizing a kiosk device, the method comprising, by a processor:
providing a web-interface portal that enables a user to generate a customized application package for customization of the kiosk device that provides document processing services via a print device;
receiving, from the user via the web-interface portal, one or more custom files to be included in the customized application package; and
generating the customized application package comprising the received one or more custom files stored in a format compatible with the kiosk device, wherein:
the user does not have access to the format, and
the customized application package when installed on the kiosk device will cause customization of the kiosk device in accordance with the one or more custom files.

21. The method of claim 20, wherein generating the customized application package further comprises:
bundling the received one or more custom files in the format compatible with the kiosk device to generate a package; and
encrypting the generated package.

22. The method of claim 21, wherein encrypting the generated package comprises asymmetrical encryption using a public key associated with the kiosk device or the user, while a private key is stored at the kiosk device.

23. The method of claim 21, wherein encrypting the generated package comprises using a randomly generated secret key.

24. The method of claim 23, further comprising:
encrypting the secret key; and
storing the encrypted secret key in a footer of the customized application package.

25. The method of claim 21, further comprising:
generating, using a cryptographic key, a digital signature associated with an entity allowed to customize the kiosk device;
encrypting the cryptographic key; and
storing the encrypted cryptographic key in a footer of the customized application package.

26. The method of claim 20, further comprising, before generating the customized application package, performing testing on the one or more custom files to verify absence of security issues.

27. The method of claim 20, wherein generating the customized application package further comprises including information, in a declarative file format, the information comprising one or more instructions for performing at least one of the following: installation of the customized application package on the kiosk device; installation of the one or more custom files on the kiosk device; or decryption of the customized application package.

28. The method of claim 20, further comprising:
creating a downloadable file including the customized application package for download to a secondary storage device; or
transmitting the customized application package to a remote server in communication with the kiosk device.

29. The method of claim 28, further comprising:
receiving, from the kiosk device, a request for the customized application package; and
causing the remote server to transmit the customized application package to the kiosk device.

30. The method of claim 20, wherein the one or more custom files comprise at least one of the following:
an application file comprising custom workflow information for executing one or more applications on the kiosk device;
an image file for a home screen display on the kiosk device;
a security file comprising information relating to one or more digital certificates to be used by the kiosk device;
a configuration file; or
an operating systems file.

31. The method of claim 20, wherein the web interface portal is provided via a client device in communication with the processor.

32. A method for customizing a kiosk device, the method comprising, by a processor:
receiving a customized application package, the customized application package comprising one or more custom files in a format compatible with the kiosk device;
retrieving an encrypted signature key stored in a footer of the customized application package;
decrypting the encrypted signature key;
using the signature key to verify that a digital signature included in the customized application package is associated with an entity allowed to configure the kiosk device; and
upon verification, installing the customized application package for customization of the kiosk device.

33. The method of claim 32, further comprising decrypting the customized application package using a private key previously stored at the kiosk device.

34. The method of claim 32, further comprising:
retrieving an encrypted secret key stored in a footer of the customized application package;
decrypting the encrypted secret key using a private key previously stored at the kiosk device; and
using the decrypted secret key to decrypt the customized application package.

35. The method of claim 32, wherein receiving the customized application package comprises receiving the customized application package from a temporary storage device coupled to the kiosk device.

36. The method of claim 32, wherein receiving the customized application package comprises:
transmitting a request for an update to a remote server; and
receiving the customized application package from the remote server.

37. The method of claim 32, further comprising customizing the kiosk device in accordance with the one or more custom files upon installation of the customized application package.

38. The method of claim 37, further comprising executing a print workflow in accordance with a custom print application included in the customized application package for printing a document at a print device that is in communication with the kiosk device.

* * * * *